US009544242B2

(12) United States Patent
Kraemer et al.

(10) Patent No.: US 9,544,242 B2
(45) Date of Patent: Jan. 10, 2017

(54) NETWORK DATA PRIORITIZER

(71) Applicant: Exara, Inc., San Juan Capistrano, CA (US)

(72) Inventors: Eric Justin Kraemer, Aliso Viejo, CA (US); Eric Tristan Lemoine, San Marcos, CA (US)

(73) Assignee: Exara, Inc., San Juan Capistrano, CA (US)

( * ) Notice: Subject to any disclaimer, the term of this patent is extended or adjusted under 35 U.S.C. 154(b) by 0 days.

(21) Appl. No.: 14/628,124

(22) Filed: Feb. 20, 2015

(65) Prior Publication Data

US 2016/0248692 A1 Aug. 25, 2016

(51) Int. Cl.
*H04L 12/865* (2013.01)

(52) U.S. Cl.
CPC .................. *H04L 47/6275* (2013.01)

(58) Field of Classification Search
CPC ............ H04L 65/605; H04L 65/1083; H04L 65/4084; H04L 65/608; H04N 7/17336
See application file for complete search history.

(56) References Cited

U.S. PATENT DOCUMENTS

| | | | |
|---|---|---|---|
| 5,802,051 A | 9/1998 | Petersen | |
| 7,272,605 B1 | 9/2007 | Hinshaw | |
| 8,583,821 B1 * | 11/2013 | Yuan | H04L 65/605 370/230 |
| 8,631,154 B2 | 1/2014 | Bartfai-Walcott | |
| 2001/0007570 A1 | 7/2001 | Mangin | |
| 2002/0126675 A1 | 9/2002 | Yoshimura | |
| 2002/0157058 A1 * | 10/2002 | Ariel | H03M 13/27 714/774 |
| 2004/0264459 A1 | 12/2004 | Yun | |
| 2006/0074961 A1 | 4/2006 | Kongalath | |
| 2007/0201481 A1 * | 8/2007 | Bhatia | H04L 65/80 370/395.2 |
| 2008/0279205 A1 * | 11/2008 | Sgouros | H04L 45/745 370/408 |
| 2010/0103932 A1 | 4/2010 | Kako | |
| 2010/0241759 A1 * | 9/2010 | Smith | H04L 47/10 709/233 |
| 2010/0322187 A1 | 12/2010 | Tani | |

OTHER PUBLICATIONS

IBM; Made in IBM Labs: Enabling Dynamic Prioritization of Data in the Cloud; IBM News Room; Armonk, N.Y.; Apr. 11, 2014.

* cited by examiner

*Primary Examiner* — Afshawn Towfighi
*Assistant Examiner* — Lakeram Jangbahadur
(74) *Attorney, Agent, or Firm* — Farjami & Farjami LLP

(57) ABSTRACT

A data packaging system is programmed to modify or otherwise manage a data stream from a data source prior to transmission to an intended recipient by applying an expressible intent regarding the data stream from the recipient in the form of a recipient signature. A data packager can apply a received recipient signature to modify the data stream based on the contents of the data stream. The modifications to the data stream can include prioritization of portions of the data stream identified as being the portions of interest to the recipient based on the signature. The data packager can then prioritize the transmission of these portions while delaying non-prioritized portions of the data stream.

14 Claims, 2 Drawing Sheets

NETWORK DATA PRIORITIZER

FIELD OF THE INVENTION

The field of the invention is network data routing and prioritization.

BACKGROUND

The background description includes information that may be useful in understanding the present invention. It is not an admission that any of the information provided herein is prior art or relevant to the presently claimed invention, or that any publication specifically or implicitly referenced is prior art.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

Year after year, the amount of data handled by the world's computer systems grows at a phenomenal rate. While fiber optic networks might be able to send tens of gigabytes of data per second, many networks are far slower and can't transmit data instantaneously from one computer to another. In order to optimize the use of data, it is frequently preferable to prioritize data transfer such that more important data is sent before less important data.

U.S. Pat. No. 7,272,605 to Hinshaw teaches a system for prioritizing data sent through a network by sending priority information with a database query or by prioritizing the transfer of some data types over other data types. Data retrieved by a query with a high priority are transferred faster than data retrieved by a query with a low priority and prioritized data types are transferred faster than data of other data types. Hinshaw's system, however, groups all data types into a single priority or groups all data in a single request into a single priority.

US 2006/0074961 to Kongalath teaches a method for prioritizing data sent through a network by dividing up a database into sections of high priority data and low priority data. Data retrieved from high priority sections of the database will the transferred faster than data retrieved from low priority sections of the database. Kongalath's method, however, fails to take into consideration how the data might be used by a data gleaner in order to prioritize data sent through the network.

U.S. Pat. No. 8,583,821 to Yuan teaches a method for prioritizing data sent through a network by providing rules that prioritize streaming data sources over other data sources. Streaming data sources are identified, for example, by analyzing a server or client IP addresses and port numbers and inferring whether the data source is a streaming data source or a lower priority data source (such as email or web page data). Yuan's method, however, also fails to take into consideration how the data might be used by a data gleaner in order to prioritize the data sent through the network.

U.S. Pat. No. 8,631,154 to Bartfai-Walcott teaches a method of prioritizing data sent through a network by assigning data to a service, and by prioritizing one service over another service. Data requested by a high priority service is sent faster than data requested by a lower priority service. Bartfai-Walcott's method, however, also fails to take into consideration how the data might be used by a data gleaner in order to prioritize the data sent through the network.

Thus, there remains a need for a system and method that prioritizes data transfer prior to injection into a network by taking into consideration how the data might be used by a data gleaner or recipient in order to prioritize the data sent through the network.

SUMMARY OF THE INVENTION

The following description includes information that may be useful in understanding the present invention. It is not an admission that any of the information provided herein is prior art or relevant to the presently claimed invention, or that any publication specifically or implicitly referenced is prior art.

The inventive subject matter provides apparatus, systems, and methods in which a data packager can manage a data stream originating from a source, prior to the introduction of the data stream into a network for transmission. The data packager manages the data stream based on an expressed intent or interest associated with an intended recipient of at least some of the data stream.

In a computer system used to introduce data (such as a data stream or other data transmissions) into a network, the data packager is preferably logically positioned between a data source and a network interface (e.g., a network packetizer), and performs its functions on the data stream prior to the execution of packetizing functions performed by the packetizer.

The intent of an intended recipient (also referred to as a "data gleaner") is expressed via a recipient signature (also referred to as the expressed "recipient interest" which can be in the form of executable code, identification information data, etc.) that is provided by the recipient to the data packager for the purposes of modifying the data stream to conform to the recipient's current interests in the data stream (or portions of the data stream such as specific content, data, etc.).

The data packager modifies the data stream as a function of content within the data stream and the received recipient signature, and passes the modified data stream to the packetizer for processing and transmission to the recipient.

In embodiments, the recipient interest can be in the form of an executable function that is executed by the data packager. Examples of contemplated executable functions include hashing functions, pattern detection functions, etc.

In embodiments, the recipient interest can be in the form of a call to an executable function stored logically proximate to and accessible by the data packager. In embodiments, the recipient interest can be a communication of one or more reference values.

Management of the data stream can include additions to, deletions from and other modifications to the data stream. Thus, unless otherwise noted or context dictates otherwise, the term "modify" will be used interchangeably with the word "manage" as related to the data stream and is intended to include additions to the data stream, deletion from the data stream, and other modifications to the data stream as described herein.

The modifications to the data stream can include setting priority levels to sections of the data stream, separating the data stream along priority levels, and emphasizing the transmission of higher-priority content by temporarily storing the lower-priority aspects of the data stream until the higher-priority aspects of the data stream have been transmitted. Other modifications can include data compression, insertion of identifiers, metadata modification, etc.

From the perspective of the recipient, the modifications to the data stream can appear non-deterministic. For example, in a data stream of 1000 images, a recipient might indicate via a recipient signature that their interest is in images including a sunset (determined via metadata of the image, image recognition, categorization of images, etc.). However, the recipient does not necessarily know how many of the 1000 images contain a sunset at all. If it is a relatively low amount of images that contain the sunset (e.g., only 1 image, 10 images, 100 images, etc.) then the data packager would prioritize the images containing the sunset towards transmission. However, if the majority of images contain the sunset (e.g., 750 of the images), the data packager might determine that filtering out the non-sunset images from the data stream introduces a processing delay that is not beneficial (because most of the images received by the recipient would include sunsets anyway without data stream management) and decide not to perform any modifications to the data stream. This decision-making can depend on the size and/or complexity of the data stream and/or the recipient signature, the present state of the network, the processing resources available to the data packager, etc.

Various objects, features, aspects and advantages of the inventive subject matter will become more apparent from the following detailed description of preferred embodiments, along with the accompanying drawing figures in which like numerals represent like components.

One should appreciate that the disclosed techniques provide many advantageous technical effects including reorganizing the priority of which data packets are more important than others by analyzing how the data will be used instead of just analyzing what the data is.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

DETAILED DESCRIPTION

Figure 1:
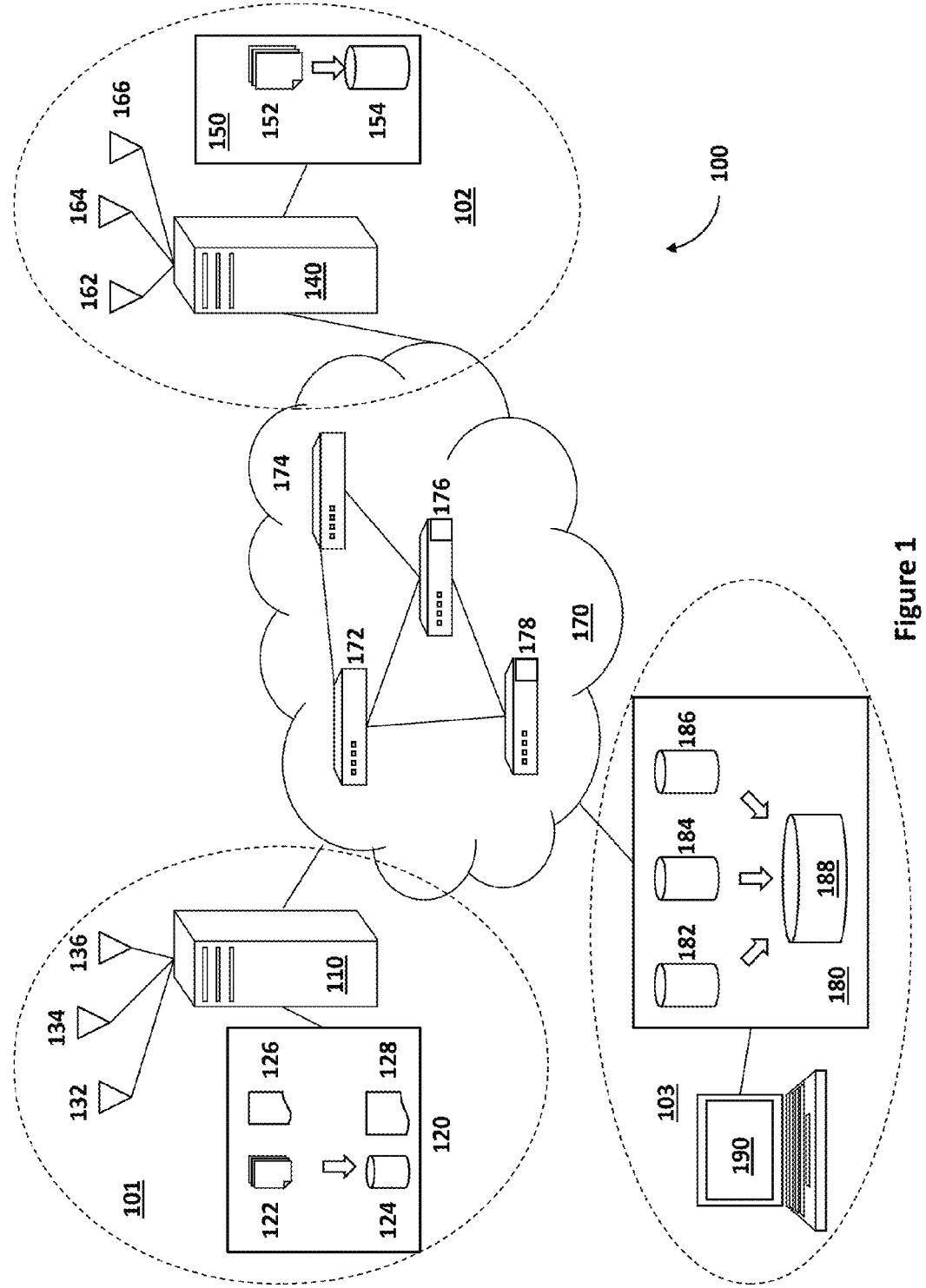
FIG. 1 is a hardware schematic of an exemplary data packaging system.

The inventive subject matter provides apparatus, systems, and methods in which a data packaging system infers the priority of at least some of the data within a data stream based upon an expressed intent from an intended recipient and the data stream itself prior to packetization of the data stream and transmission to the recipient.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. The term "functionally coupled to" means two elements that may be indirectly coupled to one another in a manner where one element interacts with the other element, such as a computer functionally coupled to another computer using a wireless router or a satellite functionally coupled to an antenna using a line-of-sight connection.

Unless the context dictates the contrary, all ranges set forth herein should be interpreted as being inclusive of their endpoints, and open-ended ranges should be interpreted to include commercially practical values. Similarly, all lists of values should be considered as inclusive of intermediate values unless the context indicates the contrary. As used herein, the term "subset" includes at least one value within a set of data up to and including the full set of data.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

It should be noted that any language directed to a computer should be read to include any suitable combination of computing devices, including servers, interfaces, systems, databases, agents, peers, engines, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network.

The terms "computer networking system", "computer network", or "network" are referenced frequently herein and used interchangeably. Examples of such systems include the Internet or corporate Ethernet WAN. Networking infrastructure within interoperable scope of the invention is assumed to have a unique addressing scheme, enabling identification of data transfer receiver or endpoint.

As will be discussed in greater detail below, functions and processes of the inventive subject matter can be executed by a "data packager." The data packager infers, or directly derives the priority of some or all discrete elements of the data based upon intent of use or empirical pattern of use by a recipient of the data, and prior to the introduction of the data into a network for transfer to a recipient destination.

FIG. 1 provides an overview of an example system 100 implementing the methods and processes of the inventive subject matter.

System 100 includes a data source 101. The term "data source" (also referred to simply as "source") is used herein to describe an originator of data on a computer system or network. This can include one or more of a hardware device, (e.g., sensors of any and all kinds, cameras, microphones, monitoring devices, etc.), a computing device, software-based application, or human interface that creates data that can be transferred over a computer network. The data source 101 can refer solely to the device that produces the data (e.g., the sensors alone), or can also include any computing devices and/or memory storage devices used to collect, store, and transmit the data into a network towards the intended recipient. In FIG. 1, data source 101 collectively refers to a computer system 110 (including a processor, RAM, networking interface components, storage, etc.), a non-transitory computer-readable memory 120 (e.g., RAM, ROM, solid-state, hard drive, flash, etc.) and sensors 132, 134, 136 (e.g. cameras, microphones, thermometers, accelerometers, pressure sensors, barometers, motion sensors, biometric sensors, industrial sensors, etc.).

Computer system 110 is shown euphemistically as a single computer having non-transient memory (not shown) and a computer processor (not shown) configured to run computer-executable instructions stored on the non-transient memory to perform various functions and processes associated with the inventive subject matter, but could be a plurality of networked computers without departing from the scope of the invention.

Computer 110 can be configured to collect data from sensors 132, 134, and 136, and save that data in memory 120. In embodiments, the data can be stored in memory 120 according to a pre-defined database structure. In embodiments, the data can be stored in raw form such as text or binary format, and in one or more files, such as archive file 122. Contemplated archives include archives disclosed in co-pending application Ser. No. 14/473,851, titled "Evolving Data Archives" filed Aug. 29, 2014, which is incorporated herein by reference. Memory 120 can be internal to computing system 110 or external to computing device 110 and connected to via a network connection.

Archive file 122 is saved on non-transitory memory 120, accessible by computer system 110, and could be in any data format, such as a csv file, a binary video stream with a simple header, or a log of raw data, such as a daily log that is opened at the beginning of the day and closes at the end of the day. In embodiments, archive file 122 can be a raw file without any sort of database structure or application identifiers. In these embodiments, the archive file 122 can optionally have associated files that give it context and assist the system in managing a data stream such as an access log, one or more archive schemas, or an archive definition file that defines data types within the archive.

The computer 110 is further configured to manage and transmit source data to an intended recipient 103. It should be noted that the data transmitted from source 101 to an intended recipient 103 can be a continuous stream of data according to an initial setup that dictates the recipient (e.g., the data source 101 is configured to continuously stream source data to the recipient without the recipient having to specifically request data at each instance) or in response to a specific data request from a recipient or data gleaner system or application. Thus, the data accessed from data source 101 to be transmitted to gleaner 103 can be a discrete set of data (for example, data obtained from storage) or a constant stream of data (e.g., from a data gathering/creation device such as a sensor constantly transmitting sensor data, or a storage device that accumulates data from such a device).

In embodiments where the data is transmitted as a continuous stream, the data transmitted can be the data obtained from one or more of the data origin points (e.g., sensors 132, 134, 136) without prior storage in memory 120 (i.e., a "live" transmission, with the computer system 110 performing the functions processes associated with the inventive subject matter as well as functions associated with preparing the data for transmission) or can be previously stored data obtained from the memory 120 (either as a transmission of pre-existing stored data, or using memory 120 as a buffer between the creation of the data by sensors 132, 134, 136 and the preparation for transmission).

The data source 101 can also include a recipient signature 126 (received from recipient 103) and system metadata 128 stored in memory 120 for use in executing functions and processes associated with the inventive subject matter. System metadata 128 can generally be considered to be information obtained from various components within system 100 that provide information about the state of the system 100 independent of any intent of the intended recipient 103. This can include information associated with available network bandwidth and/or computing resources within network 170 during transfer. System metadata 128 can include data pertinent to an application or service that uses set of data 124 during transfer, such as nodes/routers in network 170 (such as routers 172, 174, 176, or 178), other computer systems functionally connected to network 170 (such as computer system 140), and/or applications functionally connected to network 170 (such as application installed on terminal 190 consuming processing or networking resources at terminal 190 independent of the application/function that will consume received data or that generates the expressed intent).

Data source 101 also includes a data packager and a network interface. Generally speaking, the network interface is the hardware and/or software components of a computer system 110 that perform the functions of injecting the data transmitted by the computer system 110 into network 170 for transmission (and can also performs the receiving functions for data coming from the network 170). For the purposes of illustrative examples discussed herein, a "network packetizer" or simply a "packetizer" will be used as the network interface. It is contemplated that other network interfaces can be used without departing from the scope of the inventive subject matter (e.g., a direct streaming interface into a network, etc.). As is emphasized elsewhere within this description, and as will be apparent to the reader, it is important to note that the functions and processes of the data packager are performed prior to the injection of the data into the network 170 and as such, performed prior to the data reaching the network interface.

The data packager, described in further detail below, can be embodied as computer-executable instructions that are executed by data source 101 (such as by the processor of computer system 110) to manage the data 124 to be sent to the intended recipient 103 according to expressed intent of the recipient in the form of the recipient signature 126 as applied to the contents of data 124 (and optionally, other aspects of data 124 such as metadata) and, optionally, system metadata 128. In these embodiments, the data packager can be stored in memory 120 or other memory accessible for execution by processors of data source 101. In embodiments, the data packager can be a dedicated processor specifically programmed to carry out its functions according to the inventive subject matter.

The data packetizer is generally considered to be the software and hardware of a computer system (e.g. computer system 110) responsible for preparing data for transmission across network 170, including packetizing the data into packets according to standard networking and data communication protocols. It is important to note that the data packager is logically positioned between the source of data 124 (e.g. the memory 120 and/or sensors 132,134,136) and the packetizer such that the functions of the data packager are performed on data 124 prior to the data being packetized and transmitted by the packetizer. Consequently, as used herein (and unless otherwise specifically noted), references to data 124 (or source data generally) logically located prior to the packager (such as stored in memory 120 or as transmitted from sensors 132,134,136 to computer 110) are intended to refer to the data 124 prior to being analyzed and/or managed by the packager. Similarly, references to data 124 (or source data generally) logically located after the packager (e.g., at the packetizer, in transit within network 170, received and/or consumed at data gleaner 103, etc.) are considered to have been already analyzed and/or managed by the packager at data source 101.

In embodiments where the data is transmitted as a response to a request, the data source 101 the computer system 110 is configured to, in response to the request, extract a set of data 124 from archive file 122. The set of data 124 can have a defined data structure, unlike archive file 122, which can be defined at least partially by the data request and/or at least partially by a received recipient signature. A contemplated data structure might contain a header that defines a set of rows and columns, a data type for each column, a number of rows and columns total in the set, and formatting options.

FIG. 1 also shows data source 102, which can be considered to be similar to data source 101. Computer system 140 of FIG. 1 can be a system similar to computer system 110, where computer system 140 is configured to gather data from sensors 162, 164, and 166 into archive 152 (stored on non-transitory computer-readable storage medium 150), and is configured to extract sets of data, such as set of data 154 from archive 152. In some embodiments, computer system 140 is fungible with computer system 110, and could also be configured to extract reference and/or structure information from archive 152 or from other sources functionally connected to network 170.

The system 100 also includes a data gleaner 103. The term "data gleaner" refers to a recipient and user of data conveyed over a computer network system. This data gleaner/recipient can be a dedicated computing device programmed to executed the functions of the data gleaner or software code-based, and executed on a computing device. The data gleaner is characterized by an expressible intent to use the data upon receipt. The party ultimately interested in the data can be a human user, an organization, or a software application executed on a computing device. However, as used herein, "data gleaner" and "data recipient" are intended to at least refer to a computing device programmed to generate and provide the expressible intent to use the data and transmit it to the data source 101. The data gleaner can also include computing device(s) and/or applications that are programmed to receive data from a network (such as data sent by the data source 101), and memory that allows the data gleaner to store and manage data received from a data source prior to or during consumption. In embodiments, the data gleaner can also include the software applications that ultimately consume data from data source 101.

In the example illustrated in FIG. 1, data gleaner 103 can include non-transitory computer-readable memory 180 is a memory, which holds sets of data 182, 184, and 186 received from one or more sources, such as computer system 110 or computer system 140, and can be configured to aggregate such sets of data into one or more large result sets, such as set of data 188. An application accessible via computer terminal 190, which has access to memory 180, could then read any of the data received by target location 180. Such an application could be installed on computer terminal 190, or could be a distributed application on a cloud-based computer system that is merely accessible via a user interface, such as a keyboard, mouse, and/or display screen. As will be discussed in further detail below, the data gleaner 103 of the inventive subject matter will include a gleaner/recipient mechanism used to generate the recipient's expressible intent ("recipient signature") that can be transmitted to a data source 101, 102 for pre-transmission data management. In the example illustrated in FIG. 1, the recipient signature 126 is considered to have been generated by data gleaner 103 and sent to data source 101 via network 170 so that data source 101 can manage the data to be sent to the data gleaner 103.

Figure 2:
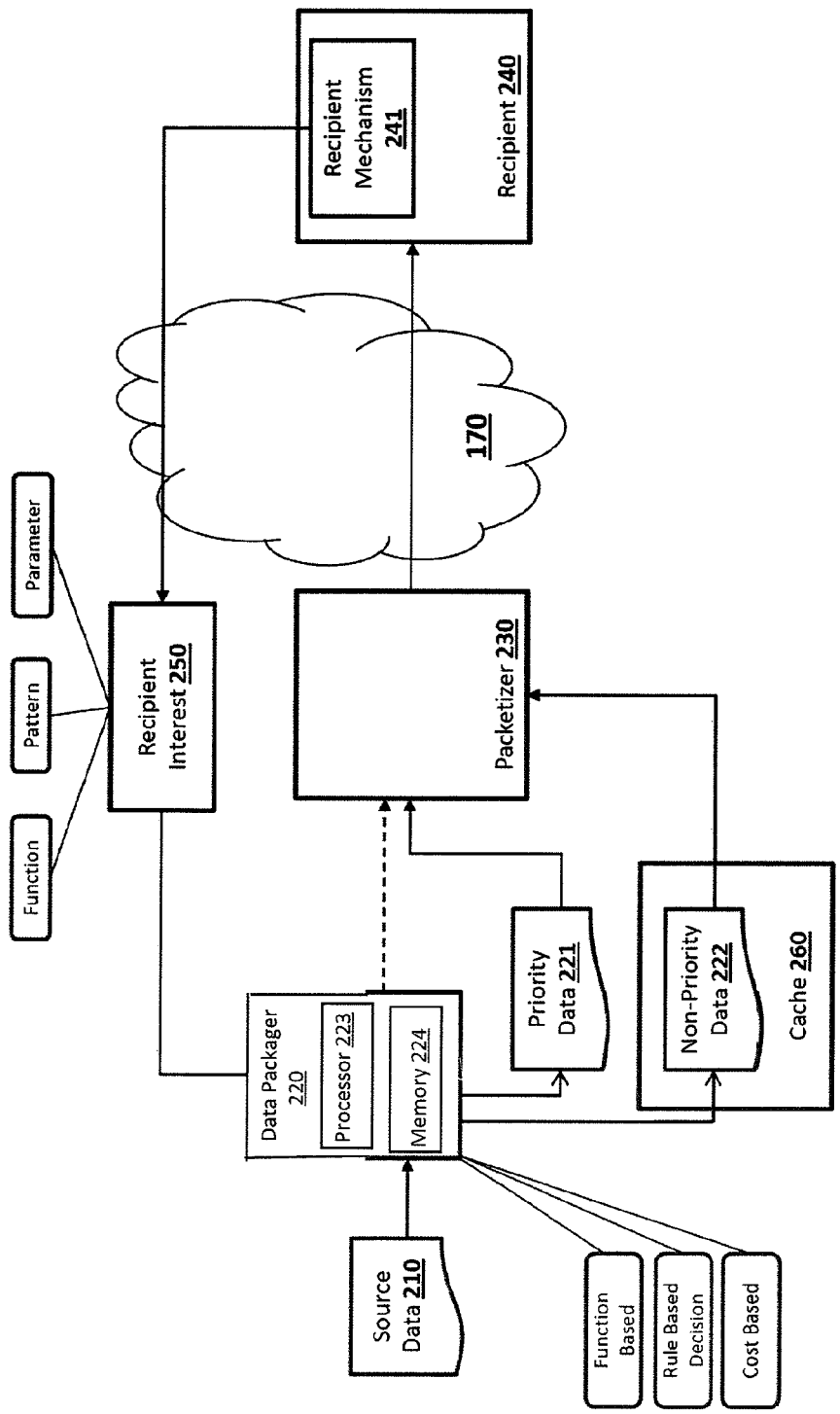
FIG. 2 is a logical schematic illustrating functions and processes of an exemplary data packaging system.

The expressible intent (signature) generated by data gleaner 103 is a mechanism by which the data source 101 can manage data prior to its introduction into a network (as a transmission of the data to the data gleaner 103) according to the data gleaner's preferences regarding the data and its contents. FIG. 2 provides an overview of an execution of processes and functions of the inventive subject matter by a system such as system 100 of FIG. 1, including the functions and processes carried out by a data packager 220 that incorporates a recipient (e.g. data gleaner's) expressible intent embodied as recipient interest 250 according to the inventive subject matter.

As shown in FIG. 2, source data 210 is the data of interest provided from a data source (such as data source 101 and/or data source 102 from FIG. 1) to an end user, such as recipient 240 (which can be the data gleaner 103 from FIG. 1). The source data 210 can be considered to correspond to data 124 of FIG. 1 prior to reaching a data packager 220.

As discussed above in relation to FIG. 1, the source data 210 can be data from an archive (e.g. archive 122), data sent directly from a sensor (e.g. sensors 132, 134, 136), or other data retrieved from other types of data collection (e.g. database).

In embodiments, source data 210 can be in the form of a data stream that the data source 101 has been set up to transmit to the recipient 240 (i.e. data gleaner 103) at a previous initial setup, and thus not in response to a specific request from recipient 240. As used herein, the term "data stream" refers generally to the transmission of a coherent and contextually definable set of data, independent from but inclusive of network related scheme such as Ethernet packetization. An example of a data stream would be a set of sensor data sent from a jet engine. The set of jet engine data may include many sensor attributes (power, temperature, pressure) as well as values for those attributes at one second intervals for an entire flight and is therefore definable as data from an object with references to object, time and source. By contrast, once transmitted over a network protocol such as Ethernet, this same data stream becomes packetized and within the network is no longer identifiable as "jet engine data." It has effectively lost context for object and source while within the network. Therefore, it should be apparent that a data stream contains context and structure from both the source 101 and the network protocol scheme used to transmit the data from source to end point(s).

In other embodiments, source data 210 can be data to be transmitted to the recipient 240 in response to a specific data query provided by the recipient 240 to the data source 101.

Data packager 220 can be a set of computer-executable instructions stored in memory 224 and executed by processor 223 to apply an expressible intent of recipient interest 250 (also referred to as a recipient signature 250) to source data 210 to determine a packaging strategy for incoming source data 210. The data packager 220 incorporates a received recipient signature 250, a local decision engine and metadata (such as system metadata 128 of FIG. 1) to heuristically determine the data packaging strategy for the source data 210. The data packager 220 can be housed within the data source 101, such as within the same computer system 110 or in a separate computing device from computer 110. As mentioned above, however, it is important to note that the data packager 220 is logically positioned between the source of the data (i.e., the archive, sensors, database, etc.) and a packetizer 230, such that the processes that the data packager 220 performs on source data 210 are performed prior to packetization and transmission over network 170. In other words, the data packager 220 is logically positioned outside of the borders of network 170 (for example, prior to packetization for transmission and/or prior to data leaving a network interface card of data source 101 to enter network 170). The local decision engine of a data packager 220 can include function-based decision processes, rule-based decision processes and cost-based decision processes.

In embodiments, the data packager 220 can be a dedicated hardware processor specifically programmed to execute its functions and processes of the inventive subject matter. In these embodiments, the data packager 220 is still located logically between the source of the data 210 and the packetizer 230.

A data packager 220 can be configured to query one or more routers or similar network equipment or services such as switches or network application services in order to gather information about the topology and performance related characteristics of the network using known source and data gleaner network addresses as a frame of reference. This information, when stored or queried directly by the data packager 220, is herein referred to as "metadata".

A data packager 220 can also be configured with access to detailed system log information, summary statistics, or results from network data transfers previously sent from a data source 101 to a data gleaner 105 or network destination associated with a data gleaner 105. This information is referred to as metadata.

Metadata is used by the data packager 220 to compose heuristic strategies that enabling pre-packaging of data-for-transfer prior to introduction of that data to a network transfer method. These strategies are derived through quantitative analysis of metadata provided to the data packager 220. In one example, a 50 gigabyte text file is to be transferred from a computer in Texas, to a computer database system in New York. There are many users of the computer database system in New York, some with different interest in the data contain within the text file. Available metadata provides a heuristic view of probable transfer time and network route for the entire file. Priorities conveyed by the database users (recipients) identify a set of priority strings that exist within the file. Based on user conveyed interest and priority, and the pre-transfer composition of probable transfer time the data packager 220 can now determine the best way to send the data contained within the file. Instead of transferring the entire contents of the file in a single file transfer, the data packager 220 extracts the priority content, slices the content into 5 separate components (or streams) for transfer, and the 5 separate components/streams are passed on to the packetizer 230 based on the priority of content (and sized appropriate for inferred network efficiency). Remaining contents of the original file are then sent only after the priority contents have arrived. As in this case, the data packager 220 is configured to be interoperable with the file transfer protocol used to convey files of this class for the application in question.

The data packager 220 can also be configured to receive feedback from the data gleaner 103 such as when and what data blocks have already been received, an estimate of the processing time of those received data's blocks by the application consuming them, capacity, resources limits and related information from the data gleaner. With the data block feedback information data gleaners can also indicate if they want to receive more or less of the same data therefore directly influencing the priority tagging. This feedback is useful in the case of very long response data streams or for data extractor that continuously output a stream of data (e.g. IoT sensors). To the extent that this feedback is representative of the intent or current interest of the data gleaner 103, this information will be provided to the data packager 220 by way of recipient signatures 250. Additional conditions about the data gleaner 103 outside of the indications of interest in the data (e.g., processing capacity information, total packets received among all interested application data, networking or other device capabilities and characteristics, etc.) can be incorporated into the recipient signature 250 or provided via other updates to the data packager 220.

Once the data packager 220 determines that a data subset has a high priority it has to decide the degree of compression to apply to the data guided by internal resources availability as well as the level of urgency potentially expressed by the data gleaner recipient of that data subset. Once the compression is done (if any) the data block is priority tagged and injected into the network on the fastest known (at the time) route to its destination. For lower priority packet the decision to be taken doesn't hinge on degree of compression but on how long should the data packager wait for other low priority data compressible to add to the block in hand in order to reduce further the percentage of bandwidth allocated to low priority data blocks.

The recipient 240 of FIG. 2 can include a recipient mechanism 241 that codifies the recipient signature 250 for interoperability with the data packager 220. The recipient mechanism 241 can be an application installed on computing devices of recipient 240, as part of an application that receives, consumes and/or requests source data from data source(s) (e.g., a module, plug-in, add-on, or otherwise a part of the interested application of recipient 240), or can be a separate application programmed to generate the recipient signature 250 based on the needs or requirements of one or more data-consuming applications at recipient 240. In embodiments, recipient mechanism 241 can be a user-facing interface accessible via a locally-executed application or via a web portal that allows a user to manually create a query for data of interest by defining the request through a menu, language-based query, or other type of interface. The recipient mechanism 241 then codifies the recipient signature 250 according to the protocol used by data packager 220 such that the user's intent expressed in the entered query is carried out on source data 210.

Thus, to affect the how the data is packaged and transmitted through network 170 to the recipient 240, the recipient 240 generates the recipient signature 250 via recipient mechanism 241 and transmits it to data packager 220.

The recipient signature 250 can be considered to be a data construct or instruction by which a recipient may define a semantic structure and pattern of interest and compose that pattern into a form that is programmatically useful to the data packager 220. The recipient signature 250 can include a function, a call to a function, a pattern identification function, a parameter, an identifier, etc.

A conceptual example of the function of the recipient signature 250 is demonstrated by two individuals discussing the color of an object. The first individual claims the object is blue and will "relay" this observation to several friends. However, the second individual claims the object is green and will relay this to many friends, some of which are shared with the first individual. There is no arbitration possible as only the two individuals see the object. Who will define what a color "looks" like in this scenario? Given this context, a "recipient signature" will act as an arbitrator, definitively stating the attributes of "blue" and "green" such that both are uniquely distinguishable.

A recipient signature 250 can come in various forms used to affect how data packager 220 manages source data 210. In embodiments, a recipient signature 250 can comprise executable code that can change or modify the processing of the source data 210 by the data packager 220 without requiring changes or modifications to the data content within the source data 210 itself.

In these embodiments, a recipient signature 250 uses a semantic structure that is supported by the data packager 220. One example semantic would be a Python computer language regular expression. A recipient signature 250 can convey data user interest to data packager 220 through software code. Extending the example provided above, a relay node 140 receives a recipient signature 250 function with the purpose of detecting "color". A capability for color detection can now be applied to source data 210 that conveys meaning for the color "blue" that is consistent with the endpoint data user's current interpretation of the color "blue". A recipient signature 250 may be stored by data packager 220 and applied by time based or algorithmic trigger. A recipient signature 250 may be supplied to a data packager 220 and applied to source data 210 already currently being accessed from the data source (such as in the case of an ongoing data stream), or against those to be transmitted at some future time. To clarify, the reference to source data 210 "currently being accessed" from the data source refers to data that is 1) in process at the source, 2) in transit between the source and data packager 210, or 3) at the data packager 220 and that in all three of these locations has not yet entered the network 170.

The data source 101 can combine recipient signature 250 with data packager 220 based on priority and compatibility instructions provided within the recipient signature 250. This combination of functions enables the data packager 220 to alter source data 210 according to the interest of the recipient 240 (again, expressed via the recipient signature 250).

In embodiments, recipient signature 250 contains a regular expression, expressed in a Java function that identifies a string of high priority (i.e., a string of high interest) within a class of source data 210 streams commonly requested by recipients (or otherwise normally directed unchanged to recipient 240). In these embodiments, the data packager 220 includes a prioritizer (also written in Java code) that incorporates a received recipient signature 250 thus enabling identification of high-priority content for received source data 210 (such as within a data stream when source data 210 is an ongoing data stream; these instances are referred to herein as "source data stream 210"). Identification of source data streams of interest among other source data streams in situations where the data packager 220 receives a plurality of data streams simultaneously is facilitated by functions and rules programmed into the data packager 220 and data stream identifiers provided by data source 102 (e.g., by the sensors 132, 134, 136 as a default part of the data generation process, inserted by computer system 110 according to the origin of the data, as part of the generation of an archive file 122, etc.).

In one example, recipient signature 250 can contain a hash function written in Java code that generates a hash value representation of a string of interest (a "recipient hash value") provided by the recipient 240. In this example, the recipient signature 250 can also include the hash value representation of the string of interest itself. Thus, to identify the data content of interest, the data packager 220 executes the hash function on some or all of the source data stream 210 as it arrives at the data packager 220 to generate a stream hash value. The data packager 220 then compares the stream hash with the hash value representation of the string of interest itself to determine whether a match exists. When the stream hash matches the hash value representation of the string of interest (either exactly or within a pre-determined acceptable degree of similarity), the data packager 220 singles out that particular segment of the data stream as containing the "high priority" content desired by the recipient.

More than one reference hash value representation (corresponding to more than one string of interest) can be included in a recipient signature 250, such as in situations where multiple levels of priority can exist.

It should be noted that the hash function can be executed on some of or all of the incoming source data stream 210. Thus, the hash function can be applied to a particular segment of a source data stream 210, a particular section of a packet, a particular section of a packet payload, according to a periodicity of the data stream, according to a pattern of packets (i.e., some are hashed, some are not, based on a pre-determined pattern), or other pre-defined logic.

Continuing with this example, if the recipient 240 wished to change the priority, reflecting an interest to receive different content faster, the recipient 240 can provide a replacement or new recipient signature 250 that can include a new hash function (to generate a new hash value representation) and a new hash value representation to use as a reference. This can correspond to a new string of interest. In a variation of this example, the new recipient signature 250 can simply include a new hash value representation to use a reference that reflects the use of the same hash function on a new string of interest. This allows for the data packager 220 to recognize a shift in priority within the same data stream (or even same section of a data stream) while employing the single hash function.

In other embodiments, the recipient signature 250 can comprise a call to a routine previously stored at the data source 102 and accessible to the data packager 220 (such as at computer system 110, memory 120, as part of data packager 220 itself or otherwise stored and accessible by the data packager 220 when necessary). The stored routine can be a previously-used recipient signature 250 for the particular recipient 240, one of a plurality of pre-defined applicable priority management routines, etc.

In still other embodiments, the recipient signature 250 can comprise a recipient identifier (such as a string of interest itself) that is matched against the data stream (or a section thereof) to identify the high-priority data contents within the source data stream 210. In these embodiments, the data packager 220 is a priori programmed to perform the comparison between the received recipient identifier and the source data stream 210 (or section thereof). In one aspect of these embodiments, the data packager 220 can be programmed to assume that a match means the corresponding segment of data is of high priority. In other aspects of these embodiments, the data packager 220 can be programmed to modify the priority according to a plurality of degrees among a scale and, as such, the recipient signature 250 can further include a designation of priority for matches within this scale.

In embodiments, the data stream identifier that identifies relevant source data streams can be separate from the string of interest or section of the source data stream hashed for comparison with the hashed value representation of the stream of interest. Thus, in these embodiments, the data packager 220 can separate potential source data streams containing content of interest from other, less relevant source data streams coming through the data packager 220. In other embodiments, the string of interest or the hash value representation data stream identifier can also be the data stream identifier, such that the high-priority data content is identified and pulled from all of the available source data streams at one time.

Data packager 220 subsequently removes and locally caches in storage 260 (such as memory 120, memory of computing system 110, or other storage accessible to data packager 220 logically located prior to the source data passing to packetizer 230 to enter the network 170) non-matching lower priority content from the source data stream 210. The resulting non-priority source data stream 222 (corresponding to the non-matching lower priority content), a reduction and therefore subset of source data stream 210, is temporarily stored in cache 260. This reduces the volume of data being transmitted on the route(s) between the source system 101 and recipient 240 within network 170. Data can be retained in cache 260 for a time period algorithmically deduced by the data packager 220 as necessary to reduce network volume based upon prior empirical model encapsulated in a rule-based decision engine within the data packager 220, for example a period of ten minutes.

The remaining, high priority, elements of source data stream 210 (representing the portion of source data stream 210 not identified for caching, and illustrated as priority data 221 in FIG. 2) are provided to the packetizer 230 for packetization and transmission to recipient 240. After ten minutes has elapsed (as set forth in this example; other examples could maintain data 222 cached until network conditions of network 170 improve, until an updated recipient interest 250 is received establishing a new priority for the data that includes content within the cached data 222, until a sufficient amount of priority data 221 (e.g., some of priority data 221, all of priority data 221, a percentage of priority data 221, etc.) has been transmitted, etc.), data stream 222 is reintroduced to the network and is routed to endpoint 120 at the discretion of the network protocol. It is not implied, or necessary that data stream 222 would take the same network or relay route to recipient 240 as data stream 221. It is contemplated that, the data stream 221 and data stream 222 can be packaged to take different routes (based on the support provided by network protocol of network 170) from each other, be sent at different times, passed to packetizer 230 in incrementally small batches, sent in an ordered fashion, or other similar strategies.

It should be noted that the because the separation of the content data of data stream 222 from data stream 221 is performed pre-packetization, the packetization process performed by packetizer 230 will generally result in "homogeneous" packets (e.g., packets containing data only from data stream 221 or only from data stream 222). However, as conditions dictate and non-priority data stream 222 is released from cache 260 to be transmitted, packets can be generated by packetizer 230 that can include data content from both priority data stream 221 and non-priority data stream 222.

In another illustrative example, a data stream 210 is made up of JSON objects having multiple properties. The recipient signature 250 function can instruct the data packager 220 to search for a value of one of the properties of the object and return the range of the value (e.g., for a value between [0,10], return a signature block of "1"; for a value between [11,100], return a signature block of "2"; [101, 1000], return a signature block of "3", [1001,10000], return signature block of "4", and so on). The data packager 220's decision logic can be set with priority rules (included in the recipient signature 250) such that a priority is assigned to data proportionally with the portions of the data stream identified by the data packager 220 (according to a specified priority or priority level for each signature block value, thresholds of signature block values, ranges of signature block values, etc). Subsequently, (for example, as the requesting system receives further data streams) the data packager 220 can apply modifications (via updates or replacements to the recipient signature 250) based on threshold logic in the data packager 220 such that if the currently applied recipient signature output is larger than "2", assign a "low" priority ("low" being one of two or more possibly priority levels; others can include "medium" or "high"). The rationale being that requesting recipient 240 has seen "enough" objects with a property value larger than 1000 for its purposes, and wishes to receive lower-range values.

In another illustrative example, a data stream 210 can be in the form of a time series made up of pairs {timestamp, value} attributes. Data packager 220 receives a source data stream 210 that is to be passed on to recipient 240. The recipient 240 of the source data stream 210 has provided a recipient signature 250 to the data packager 220 to manage the data stream. In this example, the signature 250 comprises 1) executable code programmed to identify data of interest (via a matching process to identify matches in data stream 210) and 2) provides an executable process composed of multiple procedures implemented in the C programming language. These procedures can include a procedure to split and project a buffer of time series data (the pairs attributes) into designated time intervals (e.g., one minute intervals of values) having a corresponding time interval size (in this example, a corresponding minute of value size for each discrete minute of value), an entropic compressor, a designated frequency distribution, and priority instructions. Thus, when executed by the data packager 220, the signature 250 first identifies that data stream 210 is of interest (e.g. based on a match of a reference value in a signature against data values in the data stream 210). Next, the signature 250 splits and projects the time series data into one minute intervals and subsequently passes them to the entropic compressor. The entropic compressor utilizes a frequency distribution of values received from the recipient 240 to compress the data (i.e. the one minute intervals of data) and then the priority instructions are used to calculate a priority that is added to each one minute interval. The frequency distribution from the recipient 240 can be provided as part of the signature 250 or via a separate communication. The result of the compression can be bit streams of compressed one-minute intervals, each bit stream having a bit stream size. In this example, the priority instructions can include an active rule for the data packager 220 that demands network prioritization for any signature 250 processed data targeting recipient 240. This results in the data packager 220 process creating priority data stream 221 which contains high priority data, and non-priority data stream 222 which contains low priority data. In another example, priority instructions can cause the data packager 220 to prioritize the time series minutes (in a compressed bit stream form) according to a compression level under the designated frequency distribution received from the recipient 240. For example, the priority instructions can cause the data packager 220 to send with a higher priority the time series minutes that compress the least under the designated frequency distribution. Thus, the signature 250 can cause the data packager 220 to calculate a compression ratio between the bit stream size of each bit stream and the minute of value size of the minute of value associated with the particular bit stream. The generated compression ratio can be attached to or otherwise linked with the corresponding minute of value. In one variation of this example, the recipient signature 250 can include priority instructions that cause the data packager 220 to group each minute of value into a high-priority group or a low-priority group according to its associated compression ratio. To determine whether a compression ratio of a minute of value corresponds to a high-priority group or a low-priority group, the data packager 220 compares the compression ratio of the minute of value to a mean compression ratio of all of the minutes of value in the buffer. Thus, a high-priority group can be those minutes of value having compression ratios that are larger than the calculated mean compression ratio and the low-priority group can be those minutes of value having compression ratios lower or equal to the mean compression ratio. In another variation of this example, the data packager 220 can receive a set of high-priority compression ratios (e.g., individual compression ratios or ranges/intervals of ratios) from the recipient 240 (as either part of the recipient signature 250 or as a separate communication). In this variation, the signature 250 programs the data packager 220 to group each of the minutes of value into a high-priority group or a low priority group based on their respective compression ratios falling within one of the designated high-priority ratio intervals (or in the case of individual designated high-priority ratio values, the compression ratio matching these designated high-priority ratio values) from the set of high-priority interval ratios. It is further contemplated that the set of high-priority ratio intervals can have different levels of priority for one or more of the high-priority ratio intervals in the set. Thus, the priorities associated with the high-priority ratio intervals can have additional levels beyond merely "high" and "low", and can be ranked. As such, the recipient 240 can set gradients of priority for the data it wishes to receive.

The rationale to utilize the compression levels as described in these examples can be that the recipient 240 can infer that more information is actually contained in those lesser compressed intervals of the time series, or that having computed the frequency distributions out of already received time series the recipient 240 wants to prioritize traffic that differs from what it already received. Because the entropic compression needs the frequency distribution to execute and the compression level depends on the frequency distribution, the recipient 240 is able to manipulate and change the priorities for the data packager 220 via the provision of designated frequency distributions. Over time the recipient 240 may update in part or in whole, via subsequent recipient signatures 250 (either updates to the prior signature or replacements for it), the frequency distribution and/or change the order of the entropic compressor or request the highest compressed chunks, in order to tailor the data packager 220 to its most pressing needs at that particular moment.

In embodiments, the data packager 220 processes incoming source data 210 such that all of the source data 210 is subject to either being categorized as priority data 221 or non-priority data 222, including multiple and/or other source data streams received from different origin points by the packager 220 (including data streams from sources that the recipient 240 is not interested in or may not even be set up to ever receive or request—data completely unrelated to the recipient 240). In these embodiments, none of the non-priority data 222 is allowed to pass through to packetizer 230 until a particular condition is met (such as those described above; e.g. a time limit, an improved network condition, an amount of priority data 221 has been sent, etc.). Thus, a recipient 240 can effectively bottle-neck a data source 101. In these situations, a data source 101 can access a priority or ranking list of recipients that receive its source data such that those with higher priority or ranking have a greater ability to prioritize their data over all others.

In alternative embodiments, the data packager 220 is programmed to only process source data 210 from data streams identified as "of interest" (such as via the methods and functions described above). In these embodiments, the data packager 220 can allow all non-interest data streams to proceed to packetizer 230 directly without any processing (illustrated by the broken-line arrow in FIG. 2). Thus, in these embodiments, a recipient 240 can prioritize the transmission of data of interest to them and delay transmission of data of lesser interest or priority without also hindering the data transmissions of other recipients and/or other source data streams unrelated to the recipient 240.

In embodiments, the data packager 220 is programmed to, based on the metadata associated with the state and condition of network 170, the recipient signature 250 and in some instances information about source data 210 itself and/or the origin points of the source data 210 (e.g. the sensors, the archive, etc.), determine the cost of processing the data source 210 according to the recipient signature 250. Based on the determined cost, the data packager 220 can modify or outright ignore the instructions of recipient signature 250 and simply pass the source data 210 to packetizer 230 without any processing.

Revisiting the example illustrated above, in a data stream of 1000 images, a recipient 240 can indicate via a recipient signature 250 that their interest is in images including a sunset (determined via metadata of the image, image recognition, categorization of images, knowledge of the data contained at source by data packager 220, etc.). However, the recipient 240 does not necessarily know how many of the 1000 images contain a sunset at all. If it is a relatively low amount of images that contain the sunset (e.g., only 1 image, 10 images, 100 images, etc.) then the data packager 220 can prioritize the images containing the sunset towards transmission. However, if the majority of images contain the sunset (e.g., 750 of the images), the data packager 220 can determine that filtering out the non-sunset images from the data stream introduces a processing delay that is not beneficial (because most of the images received by the recipient would include sunsets anyway without data stream management) and decide not to perform any modifications to the data stream 210.

In another example, a data packager 220 receives a plurality of recipient signatures 250 from a plurality of different recipients 240, which are applicable to a plurality of data sources 210 provided by a single data source 101. Depending on the processing capabilities of data packager 220, simply processing all of the different data streams 210 simultaneously according to the various recipient signatures 250 might cause a bottleneck at the data packager 220 by overloading (or at least heavily taxing) the processing resources available to it. This might result in some or all of the recipients 240 actually receiving their processed data slower than they would have received it without any processing. Thus, the data packager 220 can then ignore some of the processing of some of the data streams 210 to ease the processing strain. This decision can be made based on exceeding thresholds associated with estimated processing times for one or more of the data streams 210 according to one or more of the recipient signatures 250, an exceeded threshold of an estimated or measured delay between the transmission of processed priority data streams 221 versus unprocessed source data streams 220 containing at least some data identified as priority-level, or via other techniques. The data packager 220 can select which source data streams 210 to simply "pass-through" (in other words, which recipient signatures 250 to temporarily ignore) based on recipient priority status (e.g. according to a ranking or priority list), priority in terms of when recipient signatures 250 were received from their respective recipients 240 (e.g., using a first-received, first-processed priority ruleset), processing cost for each recipient's source data stream 210 based on the complexity of source data 210 and/or the recipient signature 250 (e.g. ignore the more processing-intensive signatures 250 so that more of the less-costly source data streams can be processed—more recipients having simpler processing requests get their data processed while less recipients with more costly requests are ignored), or other factors.

The network metadata can be used to affect the degree of processing by data packager 220 in combination with other factors. For example, the data packager 220 can be programmed to, in response to a relatively congested network 170 as indicated by the network metadata, increase the time to release non-priority data 222 from cache 260 (or otherwise increase the 'release' restrictions). Conversely, in a relatively wide-open network 170, the data packager 220 can decrease the release restrictions on non-priority data 222 as the network is not considered to be limiting factor in the speed with which the recipient 240 obtains their data of interest 221 (i.e., they would have received it just as fast regardless of whether the restrictions on non-priority data 222 remained at default or were loosened somewhat).

Thus, as illustrated above, this decision-making of whether to bypass normal processing by data packager 220 can depend on the size and/or complexity of the data stream 210 and/or the recipient signature 250, the present state of the network 170, the processing resources available to the data packager 220, etc.

Since networked data processing systems frequently have disparate computer devices (e.g. a Microsoft Windows system, a Red Hat system, and an Ubuntu system) and collect sensor data from a variety of disparate environments, software code for the data packager 220 is preferably written in a universally acceptable format, or in a format that could be interpreted on multiple operating systems. To support such code, the data packager 220 preferably includes some sort of regular expression engine or an ability to run specialized, bespoke code. For example, a data packager 220 could have a language interpreter (e.g. Lisp, Python), virtual machine intermediate code (e.g. Java), just in time compiled code/dynamic translation (e.g. Smalltalk, LLVM), etc.

The various data extractor functions of the inventive subject matter can incorporate one, or a combination of, rules-based decision engines, functional state engines, and cost-based optimization engines. Such rules, functions, and cost thresholds could be defined by a user, or could be "learned" by the system by performing historical analysis identifying common attributes of low performance-time systems. For example, the optimization functions can trigger an algorithmic "tie-breaker" between competing high-priority subsets when the system detects a saturated network (e.g. at least one node having a waiting list of data subsets above a specified threshold) or when the system detects a high number of high-priority subsets (e.g. at least one node having above a specified threshold number of subsets of the highest priority).

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A computer system comprising:
    a memory storing a data packager having executable instructions;
    a processor configured to execute the executable instructions of the data packager to:
        receive a recipient interest provided by a recipient;
        produce a stream of modified data using data in a data source by making a modification of at least one portion of the data as a function of at least a portion of the recipient interest, in a manner that is nondeterministic as perceived by the recipient, wherein the modification comprises separating the at least one portion of the data from the data to produce the stream of the modified data;

prioritize the at least one portion of the data in the stream of the modified data to provide prioritized data;

de-prioritize a remaining portion of the data after separating the at least one portion of the data from the data to provide de-prioritized data;

send the stream of the modified data to a packetizer of the computer system to packetize and transmit the stream of the modified data to the recipient over a network; and send the de-prioritized data to the packetizer after sending the prioritized data to the packetizer.

2. The computer system of claim 1, wherein the processor is further configured to execute the executable instructions of the data packager to:

produce the stream of the modified data as a further function of a content of the data stream, network metadata, and data source metadata.

3. The computer system of claim 1, wherein the recipient interest comprises at least one of an executable function, a call to an executable function, and a reference value.

4. The computer system of claim 3, wherein the executable function comprises a pattern detection function programmed to detect at least one pattern within the content of the data.

5. The computer system of claim 1, wherein the recipient interest comprises a hash function and a hash reference value, and wherein the processor is further configured to execute the executable instructions of the data packager to:

generate a data stream hash value of the stream of the modified data as a function of the hash function and the content of the data;

compare the data stream hash value to the hash reference value to determine a match; and produce the stream of the modified data based on the determined match.

6. The computer system of claim 1, wherein the modification comprises assigning a priority to the at least one portion of the data to produce the stream of the modified data.

7. The computer system of claim 1, wherein the stream of the modified data comprises the separated at least one portion of the data.

8. A method for use by a computer system including a memory storing a data packager having executable instructions and a processor executing the executable instructions of the data packager to perform the method comprising:

receiving a recipient interest provided by a recipient;

producing a stream of modified data using data in a data source by making a modification of at least one portion of the data as a function of at least a portion of the recipient interest, in a manner that is nondeterministic as perceived by the recipient, wherein the modification comprises separating the at least one portion of the data from the data to produce the stream of the modified data;

prioritizing the at least one portion of the data in the stream of the modified data to provide prioritized data;

de-prioritizing a remaining portion of the data after separating the at least one portion of the data from the data to provide de-prioritized data;

sending the stream of the modified data to a packetizer of the computer system to packetize and transmit the stream of the modified data to the recipient over a network; and sending the de-prioritized data to the packetizer after sending the prioritized data to the packetizer.

9. The method of claim 8, wherein the producing produces the stream of the modified data as a further function of a content of the data, network metadata, and data source metadata.

10. The method of claim 8, wherein the recipient interest comprises at least one of an executable function, a call to an executable function, and a reference value.

11. The method of claim 10, wherein the executable function comprises a pattern detection function programmed to detect at least one pattern within the content of the data.

12. The method of claim 8, wherein the recipient interest comprises a hash function and a hash reference value, and wherein the method further comprises:

generating a data stream hash value of the stream of the modified data as a function of the hash function and the content of the data;

comparing the data stream hash value to the hash reference value to determine a match; and producing the stream of the modified data based on the determined match.

13. The method of claim 8, wherein the modification comprises assigning a priority to the at least one portion of the data to produce the stream of the modified data.

14. The method of claim 8, wherein the stream of the modified data comprises the separated at least one portion of the data.

* * * * *